(12) United States Patent
Guzman-Casillas et al.

(10) Patent No.: US 7,196,884 B2
(45) Date of Patent: Mar. 27, 2007

(54) APPARATUS AND METHOD FOR DETECTING THE LOSS OF A CURRENT TRANSFORMER CONNECTION COUPLING A CURRENT DIFFERENTIAL RELAY TO AN ELEMENT OF A POWER SYSTEM

(75) Inventors: Armando Guzman-Casillas, Pullman, WA (US); Normann Fischer, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 83 days.

(21) Appl. No.: 11/070,077

(22) Filed: Mar. 2, 2005

(65) Prior Publication Data

US 2006/0198065 A1   Sep. 7, 2006

(51) Int. Cl.
   *H02H 7/04* (2006.01)
(52) U.S. Cl. .................. 361/36; 361/35; 361/63; 324/546; 324/547; 307/134
(58) Field of Classification Search .......... 361/35, 361/63, 93.1, 115, 36; 307/134; 324/546, 324/547
   See application file for complete search history.

(56) References Cited

U.S. PATENT DOCUMENTS

| | | | | |
|---|---|---|---|---|
| 4,502,086 A | * | 2/1985 | Ebisaka | 361/87 |
| 4,825,326 A | * | 4/1989 | Andow et al. | 361/63 |
| 5,325,051 A | * | 6/1994 | Germer et al. | 324/142 |
| 6,011,480 A | * | 1/2000 | Schweitzer et al. | 340/644 |
| 6,411,865 B1 | * | 6/2002 | Qin et al. | 700/286 |
| 6,442,010 B1 | * | 8/2002 | Kasztenny et al. | 361/63 |
| 6,456,947 B1 | * | 9/2002 | Adamiak et al. | 702/59 |
| 6,590,397 B2 | | 7/2003 | Roberts | |
| 6,617,839 B2 | | 9/2003 | Kang | |
| 6,804,094 B2 | * | 10/2004 | Kampmeyer | 361/42 |
| 6,804,600 B1 | * | 10/2004 | Uluyol et al. | 701/100 |
| 2002/0145841 A1 | * | 10/2002 | Williams et al. | 361/93.1 |
| 2004/0057175 A1 | * | 3/2004 | Fedirchuk et al. | 361/62 |

\* cited by examiner

*Primary Examiner*—Stephen W. Jackson
*Assistant Examiner*—Terrence Willoughby
(74) *Attorney, Agent, or Firm*—Cook, Alex, McFarron, Manzo, Cummings & Mehler, Ltd.

(57) ABSTRACT

Disclosed is an apparatus and method for detecting a loss of a current transformer connection coupling a protective relay to a power system element of a three-phase power system and providing a plurality of secondary current waveforms of the three-phase power system to the protective relay. The apparatus includes a first logic circuit and a second logic configured to provide corresponding first and second binary signals in response to respective comparisons of calculated current value(s) of a plurality of like-phase digitized current sample streams to respective threshold values. The apparatus also includes a set reset flip-flop having a set input adapted to receive the first and second binary signals to provide a third binary signal. The third binary signal indicates loss of a current transformer connection when the set input is asserted and indicates no loss of a current transformer connection when the reset input is asserted.

39 Claims, 7 Drawing Sheets

APPARATUS AND METHOD FOR DETECTING THE LOSS OF A CURRENT TRANSFORMER CONNECTION COUPLING A CURRENT DIFFERENTIAL RELAY TO AN ELEMENT OF A POWER SYSTEM

CROSS-REFERENCE TO RELATED APPLICATIONS

None

BACKGROUND OF THE INVENTION

The present invention generally relates to power system protection, and more specifically, to an apparatus and method for detecting the loss of a current transformer connection coupling a current differential relay to an element of a power system.

Electric utility systems or power systems are designed to generate, transmit and distribute electrical energy to loads. In order to accomplish this, power systems generally include a variety of power system elements such as electrical generators, electrical motors, power transformers, power transmission lines, buses and capacitors, to name a few. As a result, power systems must also include protective devices and procedures to protect the power system elements from abnormal conditions such as electrical short circuits, overloads, frequency excursions, voltage fluctuations, and the like.

In general, protective devices and procedures act to isolate some element of the power system from the remainder of the power system upon detection of the abnormal condition or a fault related to the element. More specifically, a modern current differential relay is designed to monitor current flowing into a protected power system element ("protected element"), having n electrical connections, by measuring the current flowing into the protected element and calculating inter alia, the sum of all measured current. The sum of all of the measured currents may be referred to as the difference current, the total current, or the operate current of the protected element.

Because currents resulting from a fault can easily exceed 10,000 amperes (amps) and because a current differential relay is designed to measure currents up to 100 amps via its electrical connections, the protected element is coupled to the current differential relay via current transformers that operate to proportionally step-down the primary power system current (while retaining the same phase relation) flowing into the protected element to a magnitude that can be readily monitored and measured by the current differential relay. As is known, when the protected element is operating under normal conditions, the sum of all of the (primary) currents entering the protected element is about zero (Kirchhoff's current law). If the protected element has a short circuit, or is faulted, its operate current will be substantially different than zero indicating that there is some impermissible path through which a current flows. If the operate current exceeds some threshold, or pickup current, the current differential relay issues a tripping signal to one or more power circuit breakers causing it (them) to open and therefore isolate the faulted protected element from the remainder of the power system.

Due to their integral role in current differential relay operation, if a defective current transformer delivers an incorrect or errant secondary current to the current differential relay, problems may arise in current differential relay operation. Because the incorrect or errant secondary current is not reflective of the actual primary current, it may result in failure of circuit breaker tripping in the event of a short circuit in the protected element, or may result in erroneous tripping when no short circuit exist. In other words, the current differential relay may incorrectly "perceive" a short circuit or other fault in the protected device when the errant current is actually due to a current transformer problem.

As is known, current transformers are non-linear measuring devices and, as a result, under high primary current, the secondary CT current may be proportionally drastically different from the original primary current. For example, most types of current transformers can faithfully reproduce currents up to some maximum value (e.g. 10,000 amps). However, if the primary current (e.g. $I_1$) flowing into the protected element exceeds that maximum value, current transformer saturation occurs where the output of the current transformer (e.g. $\bar{I}_1$), or the secondary current, can no longer accurately represent to the current differential relay the actual current flowing into the protective device. As a result, relay mis-operation may occur when one of the current transformers (connected between the current differential relay and the protected element) saturates and the current differential relay issues a tripping signal to the circuit breaker(s) when no short circuit exists in the protected element. It is also possible, although much less likely, that the current differential relay will fail to trip the circuit breaker(s) due to a saturated current transformer in response to a short circuit in the protected element.

Because of potential relay mis-operation, current differential relays are typically designed with a restraint mechanism intended to restrain the current differential relay (e.g., prevent it from issuing a trip signal) under certain circumstances. One restraint mechanism includes increasing the pickup current of the current differential relay as the currents entering the protected element increase. For example, Equation (1) illustrates one example of calculating the operate current for a current differential relay that utilizes a restraint mechanism.

$$I_{operate} > I_{pickup} + k \cdot I_{restraint} \tag{1}$$

where $I_{operate} = |\bar{I}_1 + \bar{I}_2 + \bar{I}_3 + \ldots \bar{I}_n|$, and $I_{restraint} = |\bar{I}_1| + |\bar{I}_2| + |\bar{I}_3| + \ldots |\bar{I}_n|$, and k=constant In other words, the current differential relay issues a tripping signal when the operate current $I_{operate}$ exceeds the sum of the pickup threshold current $I_{pickup}$ plus the product of some constant and the sum of the magnitudes of all the currents $k \cdot I_{restraint}$ entering the protected element. Alternate schemes may also be used. For example, the current differential relay can issue a tripping signal when the operate current exceeds the restraint current only or when the operate current exceeds the pickup current only.

As will be appreciated by those of ordinary skill in the art, Equation (1) may be easily modified to accommodate a typical 3-phase power system where the conductor carrying current $I_1$ is representative of three separate conductors A, B, and C, carrying three separate phase currents $I_{A1}$, $I_{B1}$, and $I_{C1}$. Likewise, the conductor carrying current $I_n$ is representative of three separate conductors A, B, and C, carrying three separate currents $I_{An}$, $I_{Bn}$, and $I_{Cn}$. In addition, the current differential relay executes Equation (1) using like phases from each of the n groups of currents resulting in, for example:

$$I_{A\_operate} > I_{pickup} + k \cdot I_{A\_restraint} \tag{2}$$

where $I_{A\_operate} = |\bar{I}_{A1} + I_{A2} + I_{A3} + \ldots I_{An}|$, and
$I_{A\_restraint} = |\bar{I}_{A1}| + |\bar{I}_{A2}| + |\bar{I}_{A3}| + \ldots |\bar{I}_{An}|$, and
k=constant In some cases where one of the connections (carrying secondary current that is proportional to its respective primary current) between the current transformer and the current differential relay becomes open or short circuited, the current entering the current differential relay from that current transformer decreases to substantially zero. In such cases, the current differential relay can potentially mis-operate because the missing current creates a false "high" operate current that may potentially exceed the trip threshold and therefore cause an unwanted tripping signal to be issued, despite the absence of a short circuit inside the protected device. Such open or short circuited connections occurring between the current transformer (CT) and the current differential relay are herein referred to as an "open CT" condition.

Various prior art algorithms have attempted to address the open CT condition; however all have limitations. For example, in one recent prior art algorithm implemented in a current differential relay to detect an open CT condition, an open CT condition is detected only for CTs carrying an incoming current, and not for CT carrying an outgoing current. Further, three seconds of stable loading conditions (i.e., total through-load current) are required before the prior art algorithm is enabled, thereby rendering the current differential relay vulnerable to mis-operation during those three seconds in the case of an occurrence of an open CT condition.

SUMMARY OF THE INVENTION

According to an aspect of the invention, disclosed is a protective relay configured to prevent generation of a trip signal, via operation of the protective relay, when a current transformer connection is lost. The current transformer connection is provided by one of a plurality of current transformers coupling the protective relay to the power system element and providing a corresponding plurality of secondary current waveforms of the three-phase power system to the protective relay. In an embodiment, the protective relay may be a current differential relay. The protective relay includes a signal logic circuit configured to provide a first binary signal in response to receipt of a plurality of like-phase digitized current sample streams derived from the plurality of secondary current waveforms. In an embodiment, a first value of the first binary signal indicates an occurrence of a short circuit in the power system element. The protective relay also includes a lost current transformer (CT) detected logic circuit configured to provide a second binary signal in response to at least one comparison of at least one calculated current value of the plurality of like-phase digitized current sample stream to at least one threshold value. A first value of the second binary signal indicates the current transformer connection loss. A trip logic circuit is coupled to the digital logic circuit and the lost CT detected logic circuit. The trip logic circuit is configured to generate the trip signal when the first binary signal has the first value and the second binary signal has a second value, and to prevent generation of the trip signal when the second binary signal has the first value.

According to another aspect of the invention, disclosed is an apparatus and method, preferably in a current-based protective relay, for detecting a loss of a current transformer connection provided by one of a corresponding plurality of current transformers coupling the protective relay to a power system element of a three-phase power system and providing a plurality of secondary current waveforms of the three-phase power system to the protective relay. The apparatus includes a first logic circuit configured to provide a first binary signal in response to at least one first comparison of at least one calculated current value of a plurality of like-phase digitized current sample streams to at least one first threshold value of a plurality of threshold values. The plurality of like-phase digitized current sample streams are derived from the plurality of secondary current waveforms. The apparatus also includes a second logic circuit configured to provide a second binary signal in response to at least one second comparison of at least one calculated current value of the plurality of like-phase digitized current sample streams to at least one second threshold value of the plurality of threshold values, and a set reset flip-flop having a set input adapted to receive the first binary signal and a reset input adapted to receive the second binary signal. The set reset flip-flop is configured to provide a third binary signal in response to selective assertion of one of the set input and the reset input. The third binary signal indicates loss of a current transformer connection when the set input is asserted, and indicates no loss of a current transformer connection when the reset input is asserted.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE INVENTION

Implementation of the system and method for detecting the loss of a current transformer connection disclosed herein prevents a current differential relay from mis-operating when a connection between a CT and the current differential relay is open or short circuited. Further, the embodiments of the system and method disclosed herein are applicable to current differential relays configured to protected a wide range of power system elements such as electrical generators, electrical motors, power transformers, power transmission lines, buses and capacitors, to name a few.

Figure 1:
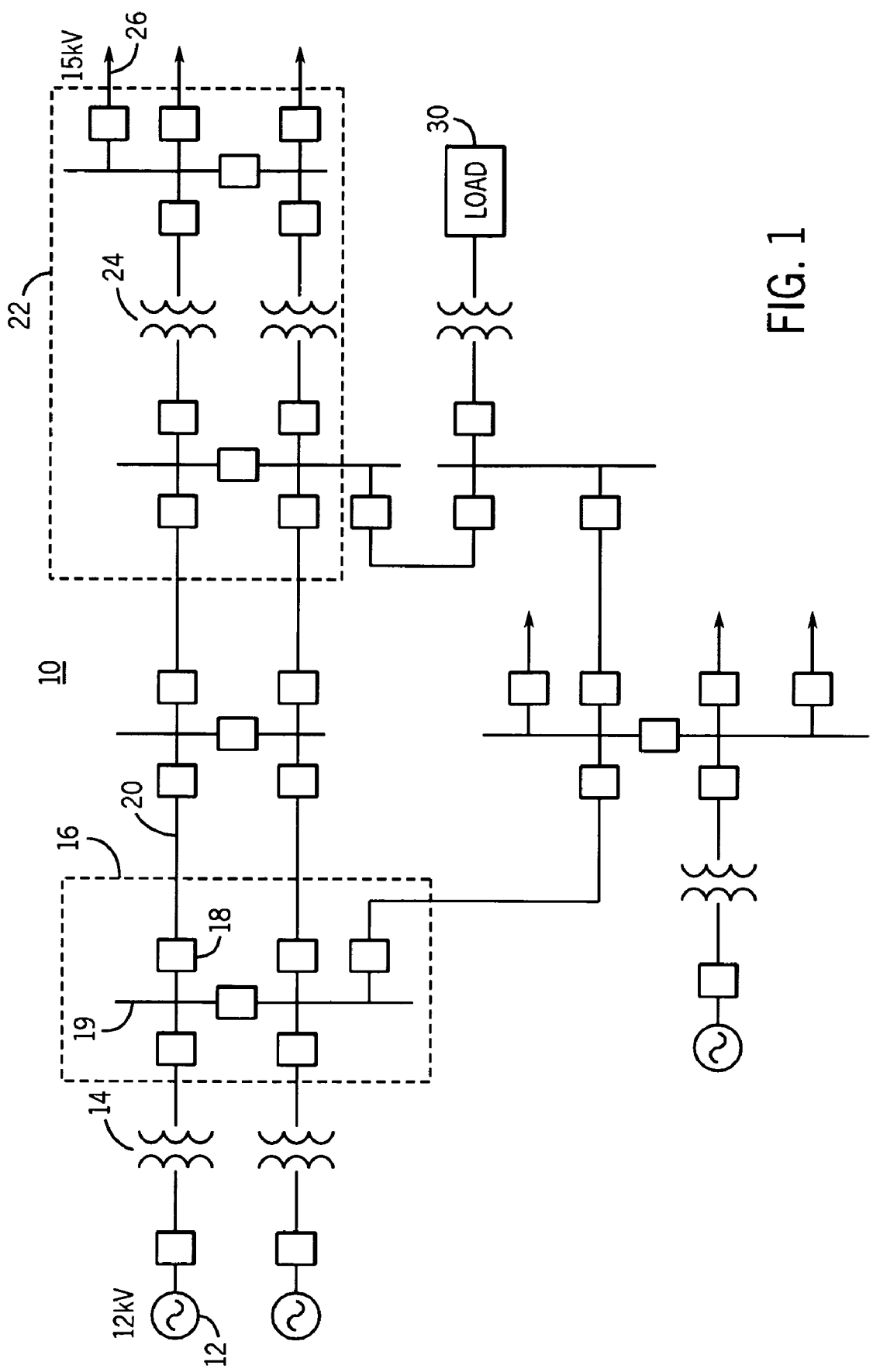
FIG. 1 is a schematic diagram of a power system that may be utilized in a typical metropolitan area.

FIG. 1 is a schematic diagram of a power system 10 that may be utilized in a typical metropolitan area. As illustrated in FIG. 1, the power system 10 includes, among other things, a generator 12 configured to generate three-phase sinusoidal waveforms at, for example, 12 kV, a step-up transformer 14 configured to increase the 12kV sinusoidal waveforms to a higher voltage such as 345 kV, and a first substation 16 including a number of circuit breakers 18 and transmission lines 20 interconnected via a first substation bus 19. The first substation 16 provides the higher voltage sinusoidal waveforms to a number of long distance transmission lines such as a transmission line 20. At the end of the long distance transmission line 20, a second substation 22 includes a step-down transformer 24 to transform the higher voltage sinusoidal waveforms to a lower voltage (e.g., 15 kV) suitable for distribution via a distribution line 26 to various end users and loads.

As previously mentioned, the power system 10 includes protective devices and procedures to protect the power system elements from abnormal conditions. Some of the protective devices and procedures act to isolate corresponding protected elements (e.g., the transmission line 20) of the power system 10 upon detection of short circuit or fault. Other types of protective devices used in the power system 10 provide protection from thermal damage, mechanical damage, voltage sags and transient instability.

The protective devices and procedures utilize a variety of protective relay logic schemes to determine whether a fault or other problem exists in the power system 10. For example, some types of protective relays utilize a current differential comparison to determine whether a fault exists in the protected element. Other types of protective relays compare the magnitudes of calculated phasors representative of the three-phase sinusoidal waveforms to determine whether a fault exists. Frequency sensing techniques and harmonic content detection is also incorporated in protective relays to detect fault conditions. Similarly, thermal model schemes are utilized by protective relays to determine whether a thermal problem exists in the protected element.

For example, protection for the generator 12 may be provided by a generator differential protective relay (e.g., ANSI 87G), protection for the transformer 14 may be provided by a transformer overcurrent relay or a transformer differential protective relay (e.g., ANSI 87T) and protection for the circuit breaker 16 may be provided by a breaker failure relay. Similarly, protection for the transmission line 20 may be provided by a phase and ground distance relay or a line current differential relay (e.g., ANSI 87L), and protection of the distribution line 26 may be provided by a directional overcurrent and reclosing relay. Many protective relay logic schemes are possible.

In almost all cases however, step-down current and voltage transformers are used to connect the protective relays to their corresponding higher power protected elements. The resulting lower secondary currents and voltages can be readily monitored and/or measured by the protective relays to determine corresponding phasors that are used in the various overcurrent, voltage, directional, distance, differential, and frequency protective relay logic schemes. For example, during operation of a number of current transformers, coupling a protected element of the power system 10 to a current differential relay, each of the primary currents is "measured" as a proportional secondary current from a respective current transformer by the current differential relay. When the protected element has a short circuit, or is faulted, the sum of the proportional secondary currents (proportional to the sum of the primary currents) will be substantially different than zero and a tripping signal may result.

Figure 2:
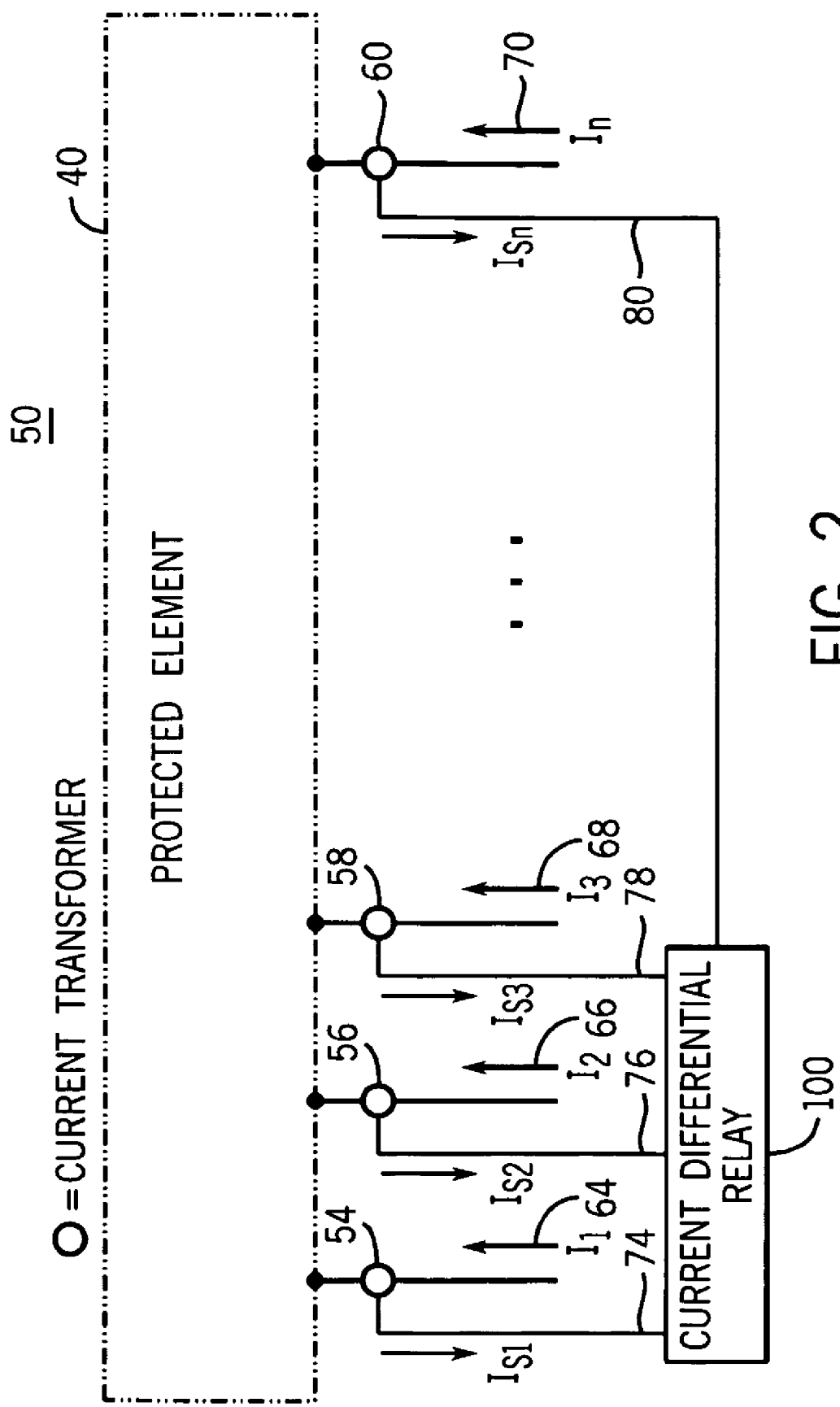
FIG. 2 is a block diagram of a current differential protection system including a current differential relay coupled to a protected element via a number of current transformers according to an embodiment of the invention.

FIG. 2 is a block diagram of a current differential protection system 50 according to an embodiment of the invention. As illustrated, the current differential protection system 50 includes a current-based protective relay such as a current differential relay 100 coupled to a protected element 40 via n current transformers according to an embodiment of the invention. Although shown as n current transformers 54, 56, 58 to 60 for illustrative purpose, it should be understood that two or more current transformers may be used to couple the current differential relay 100 to the protected element 40.

The current differential relay 100 utilizes the secondary current waveforms of the current transformers to perform its monitoring functions. Thus, each of the n current transformers 54, 56, 58 to 60 is configured to step-down the current magnitudes of respective actual power system current waveforms 64, 66, 68 to 70 to corresponding secondary current waveforms 74, 76, 78 to 80, having magnitudes suitable for use by the current differential relay 100. Each of the actual power system current waveforms 64, 66, 68 to 70 is equal to respective corresponding secondary current waveforms 74, 76, 78 to 80 multiplied by respective current transformer ratios (turn ratios) of the respective current transformers 54, 56, 58 to 60. For example, $I_1 = n_1 \bar{I}_{S1}$ or $$\bar{I}_{S1} = \frac{I_1}{n_1}$$

where $n_1$ is the turn ratio of the current transformer 54.

During operation, the current differential relay 100 processes the secondary current waveforms 74, 76, 78 to 80 received via respective current transformers 54, 56, 58 to 60. The secondary current waveforms 74, 76, 78 to 80 are filtered, sampled and then digitized for use by a microprocessor. The microprocessor then extracts a vector that is representative of each of the primary power system current waveforms 64, 66, 68 to 70, and performs calculations (e.g., Equations (1) and (2) above) to determine if a short circuit exists in the protected element 40.

Figure 3:
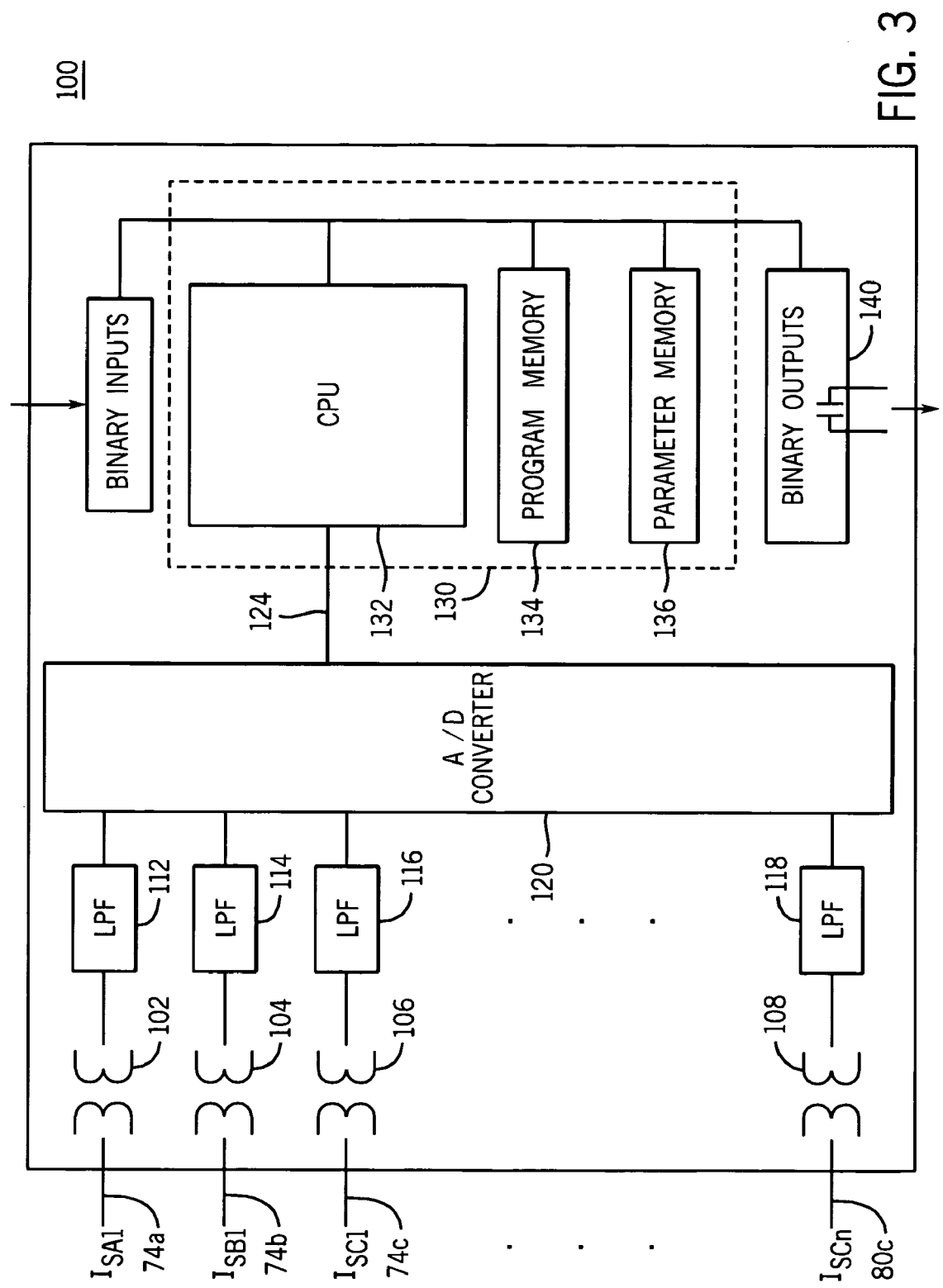
FIG. 3 is a block diagram of an exemplary configuration of the current differential relay of FIG. 2.

For example, FIG. 3 is a block diagram of an exemplary configuration of the current differential relay 100 of FIG. 2 where the secondary current waveform 74, illustrated as $I_{s1}$ is representative of three separate conductors A, B, and C, providing three separate secondary current waveforms 74a, 74b, 74c, illustrated as $I_{sA1}$, $I_{sB1}$, and $I_{sC1}$. The secondary current waveform current 80, illustrated as $I_{sn}$ is representative of three separate conductors A, B, and C, providing three separate secondary current waveforms 80a, 80b, 80c, where only $I_{sCn}$ is shown. Although only secondary current waveforms 74a, 74b, 74c to 80c are shown in FIG. 3 for ease of illustration and discussion, it should be understood that all secondary current waveforms from 74a to 80c, illustrated $I_{sA1}$ to $I_{sCn}$, are included.

Referring to FIG. 3, during operation, secondary current waveforms 74a, 74b, 74c to 80c received by the current differential relay 100 are further transformed into corresponding voltage waveforms via respective current transformers 102, 104, 106 to 108 and resistors (not separately illustrated), and filtered via respective low pass filters 112, 114, 116 to 118. An analog-to-digital (A/D) converter 120 multiplexes, samples and digitizes the filtered secondary current waveforms to form corresponding digitized current waveform samples (e.g., 1011001010001111).

As shown in FIG. 3, the A/D converter 120 is coupled to a microcontroller 130 having a microprocessor, or CPU 132, a program memory 134 (e.g., a Flash EPROM) and a parameter memory 136 (e.g., an EEPROM). The microcontroller 130 executing a computer program or relay logic scheme (discussed below) processes each of the digitized current waveform samples to extract corresponding vectors representative of their corresponding actual power system current waveforms, and then performs various calculations using the vectors to determine whether a short circuit exists in the protected element 40. If a short circuit is detected, the microcontroller 130 will cause binary output contacts 140 to be closed, thereby opening an associated power circuit breaker to isolate the short circuited protected element from the remainder of the power system.

Figure 4:
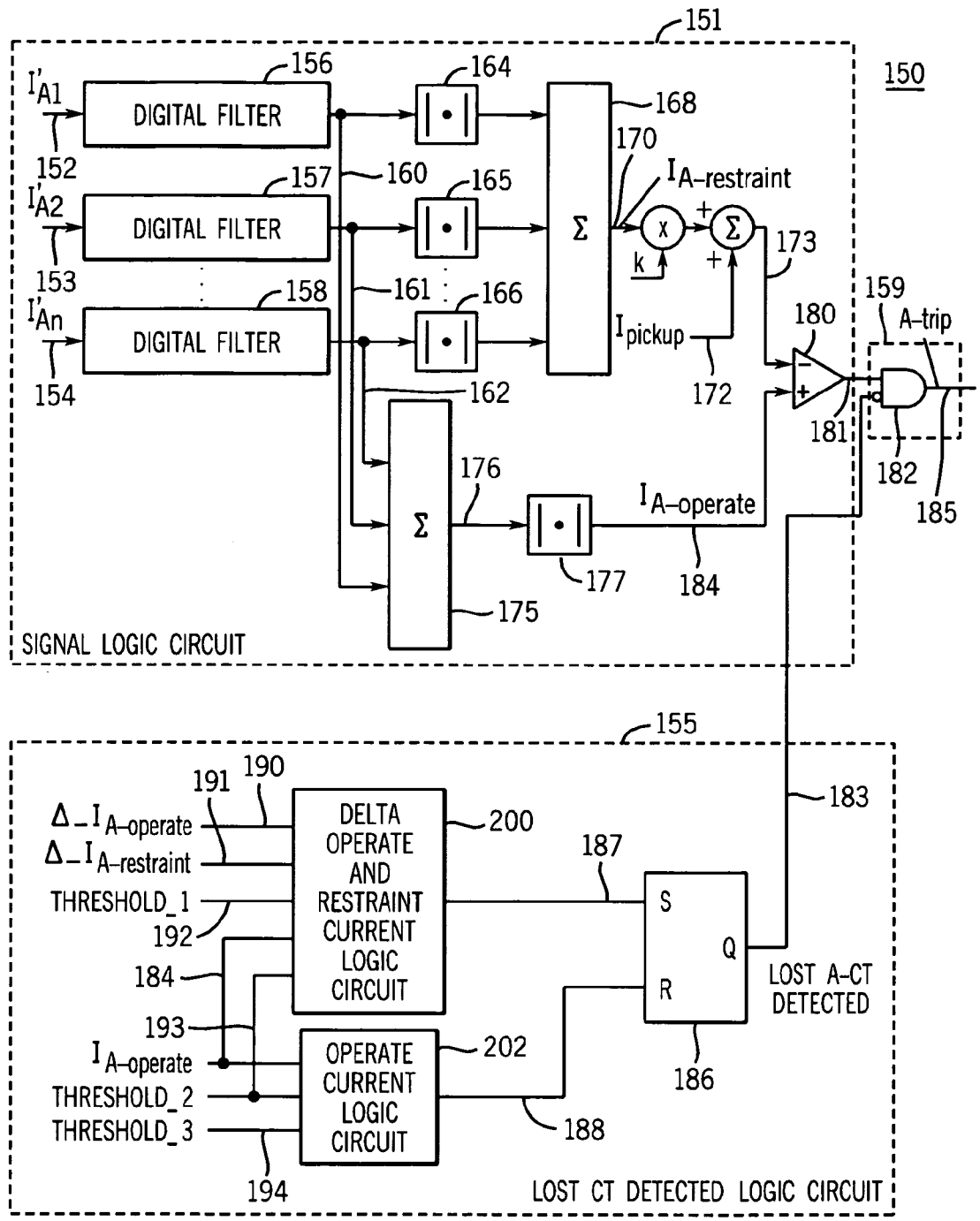
FIG. 4 is a block diagram of a logic scheme executed in a microcontroller of the current differential relay of FIG. 2 to detect the loss of a current transformer connection according to an embodiment of the invention.

In addition to performing various calculations to determine whether a short circuit exists in the protected element, the microcontroller 130 is also configured to detect an open CT condition (i.e., a lost current transformer connection) as illustrated below in FIGS. 4–6. FIG. 4 is a block diagram of a relay logic scheme 150 executed in the microcontroller 130 to detect the loss of a current transformer connection and block issuance of a tripping signal by the current differential relay 100 according to an embodiment of the invention. The relay logic scheme 150 is preferably included in the current differential relay 100.

Referring to FIG. 4, the relay logic scheme 150 includes a Signal logic circuit 151, a Lost CT detected logic circuit 155 and a Trip logic circuit 159. An output from each of the Signal logic circuit 151 and the Lost CT detected logic circuit 155 provides a corresponding input to the Trip logic circuit 159. Referring to FIGS. 3 and 4, digitized current waveform samples from the A/D converter 120 are grouped in like-phase currents (e.g., all of the digitized current waveform samples resulting from A-phase primary power system current waveforms 64, 66, 68 to 70) for processing by the Signal logic circuit 151. While preferably grouped prior to receipt by the Signal logic circuit 151, it is contemplated that the digitized current waveform samples from the A/D converter 120 may be grouped into like-phase currents by the Signal logic circuit 151.

For ease of discussion, the digitized current waveform samples processed by the microcontroller 130, resulting from three A-phase primary power system current waveforms 64, 66 to 70 are herein referred to as digitized current sample streams 152, 153 to 154, and illustrated as I'$_{A1}$, I'$_{A2}$, to I'$_{An}$. It should be noted however, that while only three digitized current sample streams 152, 153 and 154 are shown for ease of discussion, the actual number (denoted as n) of digitized current sample streams depends on the number of current transformers used to couple the current differential relay 100 to the protected element 40.

During operation, the digitized current sample streams 152, 153 to 154 are received by respective digital filters 156, 157 to 158 and processed to extract corresponding fundamental components (corresponding to the A-phase primary power system current waveforms 64, 66 to 70). The respective digital filters 156, 157 to 158 may be one of any number of suitable digital filters such as, for example, full cycle cosine filters, half-cycle cosine filters, full cycle Fourier filters and half cycle Fourier filters.

The resulting filtered current sample streams 160, 161 to 162 are processed by respective magnitude calculators 164, 165 to 166 to extract corresponding magnitudes of the fundamental components of the digitized current sample streams 152, 153 to 154, where the magnitude is proportional to the peak value of the corresponding waveform. The magnitudes of the fundamental components of the digitized current sample streams 152, 153 to 154 are then summed by an adder 168 to form the restraint current 170, where $I_{A\_restraint} = |I_{A1}| + |I_{A2}| + |I_{A3}| + \ldots |I_{An}|$, as described above in Equation (2).

Referring again to FIG. 4, the resulting filtered current sample streams 160, 161 and 162 are also summed via an adder 175 to form a sum of the filtered current sample streams 176, and another magnitude calculator 177 extracts a magnitude of the sum of the filtered current sample streams 176 to form the operate current 178, $I_{A\_operate} = |I_{A1} + I_{A2} + I_{A3} + \ldots I_{An}|$, as described above in Equation (2). The restraint current 170, $I_{A\_restraint}$, is then multiplied by a constant k (a preselected percentage value), and added to the pickup current 172, $I_{pickup}$, to form weighted current value 173. A comparator 180 then compares the weighted current value 173 to the operate current 184 to form a binary signal 181. In one embodiment, the binary signal 181 is a logic high (i.e., 1) if the operate current 184 is greater than the weighted current value 173 indicating that a fault exists in the protected element 40, and low (i.e., 0) if the operate current 184 is less than the weighted current value 173 indicating no fault condition. The binary signal 181 is then applied to a first input of an AND-gate 182 of the trip logic circuit 159. Thus, unlike prior art protective relays, the current differential relay 100 does not automatically issue a tripping signal when the operate current exceeds the pickup current plus the restraint current; rather, the binary signal 181 applied to the trip logic circuit 159 is "AND-ed" with a binary signal 183 generated by the Lost CT detected logic circuit 155 to block issuance of a trip signal when an open CT condition is present.

To summarize operation of the relay logic scheme 150, when the binary signal 181 is a logic high signal indicating an occurrence of a short circuit in the protected element 40, and when the binary signal 183 is a logic low (i.e., when a Lost A-CT detected signal is NOT asserted by the Lost CT detected logic circuit 155), an A-trip signal 185 is issued by the trip logic circuit 159, and a corresponding power system circuit breaker operates to isolate the protected element 40 from the remainder of the power system. As discussed below, the binary signal 183 is asserted when the microcontroller 130 detects an open CT condition in one of any of current transformer outputs carrying the A-phase secondary current waveforms 74, 76, 78 to 80 from each of the respective n current transformers 54, 56, 58 to 60. Although discussed in terms of the A-phase primary power system current waveforms, operation of the relay logic scheme 150 is equally applicable to B-phase primary power system current waveforms and C-phase primary power system current waveforms received by the protected element 40.

Referring again to FIG. 4, the lost CT detected logic circuit 155 includes the Delta operate and restraint current logic circuit 200 and an Operate current logic circuit 202, each having an output coupled to a respective input of a set/reset (S/R) flip-flop 186. The output of the S/R flip-flop 186 provides the binary signal 183 (the Lost A-CT detected signal) to the second input of the AND-gate 182.

As illustrated, the Delta operation and restraint current logic circuit 200 is configured to receive five inputs; a delta operate current value 190 illustrated as $\Delta I_{A\_operate}$, a delta restraint current value 191 illustrated as $\Delta I_{A\_restraint}$, the operate current value 184 illustrated as $I_{A\_operate}$, a first threshold value 192 illustrated as Threshold_1, and a second threshold value 193 illustrated as Threshold_2. Thus, two threshold values and three calculated current values are utilized by the Delta operation and restraint current logic circuit 200. The Operate current logic circuit 202 is configured to receive three inputs; the operate current value 184, the second threshold value 193 and a third threshold value 194 illustrated as Threshold_3. Thus, two threshold values and one calculated current value are utilized by the Operate current logic circuit 202. Each of the first, second and third threshold values 192, 193, 194 is preselected as discussed below.

In summary, during operation of the Lost CT detected logic circuit 155, the output Q of the S/R flip-flop 186 asserts (e.g., the binary signal 183 is a logic high) when the set input S asserts via the binary signal 187. The set input S of the S/R flip-flop 186 asserts in response to operation of the Delta operation and restraint current logic circuit 200. After the set input S de-asserts, the output Q remains asserted until the reset input R asserts via the binary signal 188. The reset input R of the S/R flip-flop 186 asserts in response to operation of the Operate current logic circuit 202.

Figure 5:
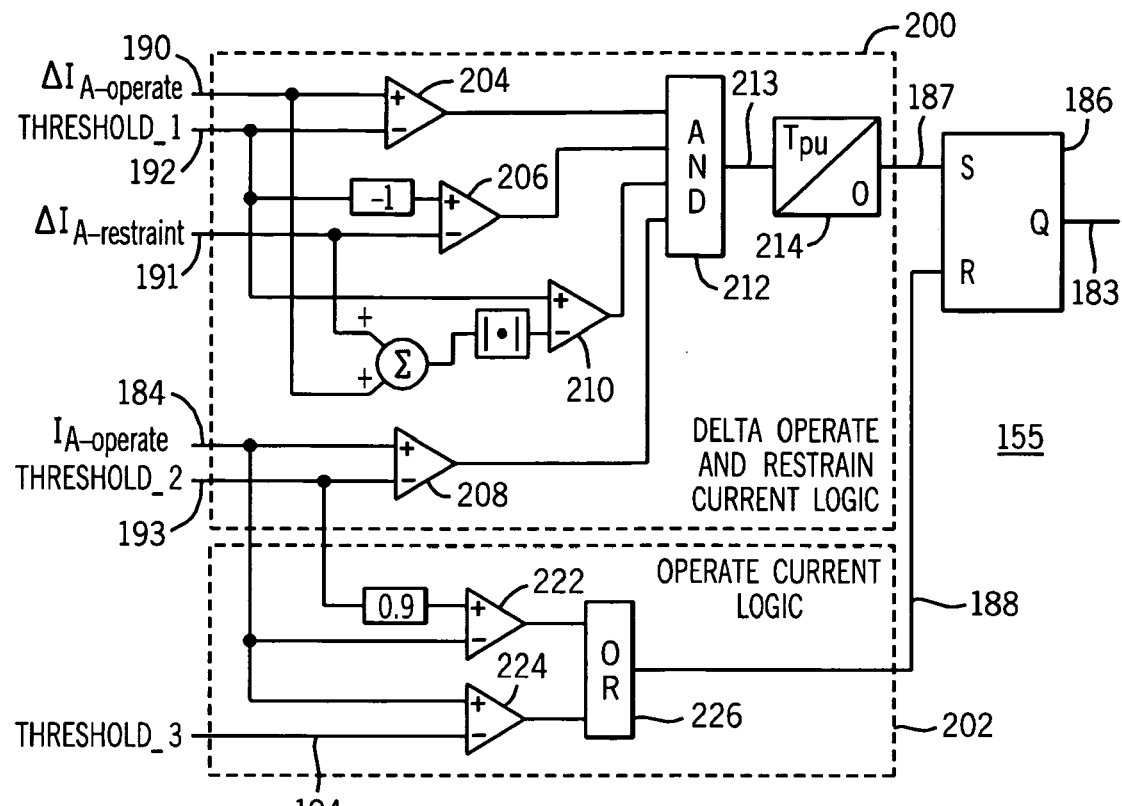
FIG. 5 is an exemplary detailed logic block diagram of a Lost CT detected logic circuit of FIG. 4.
Figure 6:
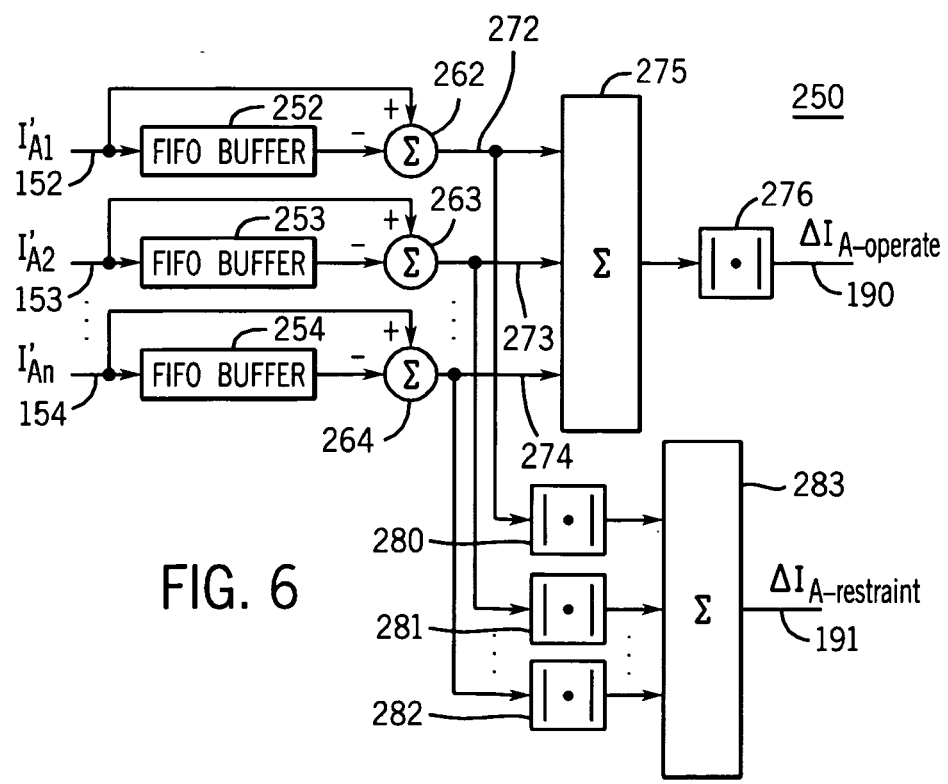
FIG. 6 is a block diagram of an exemplary current change logic circuit used to calculate changes in the operating and restraint currents associated with the current differential relay of FIG. 2 according to an embodiment of the invention.

FIG. 5 is an exemplary detailed logic block diagram of the Lost CT detected logic circuit 155. Referring to FIG. 5, the Delta operate and restraint current logic circuit 200 includes a first comparator 204 having a first input adapted to receive the delta operate current value 190 and a second input adapted to receive the first threshold value 192 and a second comparator 206 having a first input adapted to receive a negative of the first threshold value 192 and a second input adapted to receive the delta restraint current value 191. The Delta operate and restraint current logic circuit 200 also includes a third comparator 208 having a first input adapted to receive the operate current value 184 and a second input adapted to receive the second threshold value 193, and a fourth comparator 210 having a first input adapted to receive the first threshold value 192 and a second input adapted to receive the magnitude of the sum of the delta restraint current value 191 and the delta operate current value 190. The Delta operate and restraint current logic circuit 200 further includes an AND-gate 212 having four inputs where each of the four inputs is adapted to receive an output from the first comparator 204, the second comparator 206, the third comparator 208 and the fourth comparator 210, respectively. The output of the AND-gate 212 is provided to a qualification timer 214, and an output of the qualification timer 214 is provided to the set input S of the S/R flip-flop 186 as the binary signal 187. Although shown between the AND-gate 122 and the S/R flip-flop 186, it is contemplated that the qualification timer may be excluded from the Lost CT detected logic circuit 155.

During operation of the Delta operate and restraint current logic circuit 200, the delta operate current value 190 (i.e., a scalar representing a change in the operate current) is compared to the first threshold value 192 via the first comparator 204, the negative of the first threshold value 192 is compared to the delta restraint current value 191 (i.e., a scalar representing a change in the restraint current) via the second comparator 206, the operate current value 184 is compared to the second threshold value 193 via the third comparator 208, and the first threshold value 192 is compared to the magnitude of the sum of the delta restraint current value 191 and the delta operate current value 190 via the fourth comparator 210.

If the delta operate current value 190 is greater than the first threshold value 192, and delta restraint current value 191 is less than the negative of first threshold value 192, and the magnitude of the sum of the delta restraint current value 191 and the delta operate current value 190 is less than the first threshold value 192, and the operate current value 184 is greater than the second threshold value 193, then the input 213 to the qualification timer 214 asserts. If the input to the qualification timer 214 remains asserted for a qualification time $T_{pu}$, then the output of the qualification timer 214 asserts via the binary signal 187 and sets the S/R flip-flop 186. The comparison made by the first, second and fourth comparator, 204, 206, 210, respectively where each of the delta operate current value 190, the delta restraint current value 191 and the magnitude of their sum, is compared to the first threshold value 192, is used to detect an increase in the operate current value 184 that is substantially the same amount that the restraint current value 170 decreases. Operation of the third comparator 208, comparing the operate current value 184 to the second threshold value 193, ensures that that there is a potential open CT problem before the S/R flip-flop 186 is allowed to set. Further, operation of the third comparator 208 also allows the S/R flip-flop 186 to reset should the connection to a current transformer such as the current transformer 54, be restored. When the connection is restored, the operate current value 184 will decrease to a value less than the second threshold value 193, thereby removing the set condition of the S/R flip-flop 186.

Referring again to FIG. 5, the Operate current logic circuit 202 includes a fifth comparator 222 having a first input adapted to receive 0.9 times the second threshold value 193, and a second input adapted to receive the operate current value 184. The Operate current logic circuit 202 also includes a sixth comparator 224 having a first input adapted to receive the operate current value 184, and a second input adapted to receive the third threshold value 194. The Operate current logic circuit 202 further includes an OR-gate 226 having two inputs where each of the two inputs is configured to receive an output from the first comparator 222 and the second comparator 224, respectively. An output of the OR-gate 226 is provided to the reset input R of the S/R flip-flop 186 as the binary signal 188.

During operation of the Operate current logic circuit 202, the S/R flip-flop 186 is reset if either one of two conditions occurs; if the operate current value 184 is less than 0.9 times the second threshold value 193, or if the operate current value 184 exceeds the third threshold value 194. If the operate current value 184 is less than 0.9 times the second threshold value 193, the S/R flip-flop 186 is reset because the operate current value 184 has decreased to a level that indicates that the open CT condition has been corrected. If the operate current value 184 exceeds the third threshold value 194, the S/R flip-flop 186 is reset because the operate current value 184 has exceeded a predetermined level (i.e., the third threshold value 194) indicative of a high probability that the protected element 40 is itself faulted by, for example, a short circuit. When either of the two conditions exists to cause the S/R flip-flop 186 to be reset, the binary signal 183 (illustrated as the Lost A-CT Detected signal in FIG. 4) is de-asserted and normal current differential relay operation resumes.

Referring to FIGS. 4 and 5, the value of the first threshold value 192 is chosen to control the sensitivity of the current differential relay 100 to open CT conditions. As increasingly larger values are selected for the first threshold value 192, a proportionately greater increase in the operate current value and a corresponding greater increase in the restraint current value is required before the S/R flip-flop 186 sets (i.e., before the input S is asserted). As a result, the first threshold value 192 must be less than the sensitivity level of the current differential protection provided by the current differential relay 100. That is, Threshold_1<$I_{pickup}$ (see, FIG. 4). Conversely, as a decreasingly smaller value is selected for the first threshold value 192, a proportionate increase in vulnerability to inadvertent assertion of the input S due to noise or other errors in the current measurements exists. As a result, the first threshold value 192 must be selected to be greater than the maximum expected noise and other errors in the current measurements. For example, a suitable first threshold value 192 is 10% of the expected nominal (i.e., non-short circuit) current flowing into the protected element 40 as measured by the current differential relay 100.

The second threshold value 193 is chosen to control resetting of the S/R flip-flop 186 when the open CT condition is corrected. After the open CT condition is corrected, the operate current value 184 will decrease to some small value (a "standing operate current"), depending on current measuring errors and leakage current (e.g., capacitive leakage) flowing into the protected element 40 via a path other than the intended paths provided by the current transformers. As a result, the second threshold value 193 must be larger than this standing operate current. If second threshold value 193 is too large, however, the input S of the S/R flip-flop 186 may not be asserted properly when an open CT condition exists. As a result, the second threshold value 193 must be smaller than the sensitivity of the differential protection. In other words, Threshold_2<$I_{pickup}$ (see, FIG. 4). For example, a suitable second threshold value 193 is 10% of the expected nominal current flowing into the protected element 40 as measured by the current differential relay 100.

The third threshold value 194 is chosen to control resetting of the S/R flip-flop 186 when a short circuit exists in the protected element 40. If the third threshold value 194 is too small, the presence of the standing operate current will not allow the input S of the S/R flip-flop 186 to be properly asserted. If the third threshold value 194 is too large, an occurrence of a short-circuit in the protected element 40 will not properly reset the S/R flip-flop 186 and therefore the current differential relay 100 will not operate as intended. For example, a suitable third threshold value 194 is 150% of the expected nominal current flowing into the protected element 40 as measured by the current differential relay 100.

The delta operate current value 190, $\Delta I_{A\_operate}$, and the delta restraint current value 191, $\Delta I_{A\_restraint}$, may be calculated in one of any number of ways. For example, FIG. 6 is a block diagram of an exemplary current change calculation circuit 250 that may be used to calculate the delta operate current value 190 and the delta restraint current value 191 according to an embodiment of the invention. Referring to FIG. 6, the exemplary current change calculation circuit 250 includes a first First In, First Out buffer (FIFO) 252, a second FIFO buffer 253 and a third, or $n^{th}$ FIFO buffer 254, each having the digitized current sample streams 152 $I'_{A1}$, 153 $I'_{A2}$ and 154 $I'_{An}$, as inputs, respectively. Although only three FIFO buffers are shown, it should be noted that the number of FIFO buffers is selected to correspond to the number of digitized current sample streams 152, 154 to 154 (i.e., n digitized current sample streams) processed via the relay logic scheme 150.

The exemplary current change calculation circuit 250 also includes a first adder 262, a second adder 263 and a third adder 264 coupled to an output of the first FIFO buffer 252, the second FIFO buffer 253 and the third FIFO buffer 254, respectively. Each of the first, second and third adders 262, 263 to 264 is configured to subtract the output of a corresponding FIFO buffer (e.g., the first FIFO buffer 254), from a corresponding digitized current sample stream (e.g., the digitized current waveform 152 $I'_{sA1}$) to form a corresponding first sum 272, second sum 273 and third sum 274. Although illustrated as three sums, it should noted that the number of corresponding sums is based on the number of digitized current sample streams 152, 154 to 154 processed via the relay logic scheme 150.

A fourth adder 275 is coupled to the outputs of the first, second and third adders 272, 273 to 274, respectively. Further, each of the outputs of the first, second and third adders 272, 273 to 274, is coupled to an input of a corresponding first, second, and third magnitude calculator 280, 281 to 282, respectively. As illustrated, the output of the fourth adder 275 is coupled to an input of a fourth magnitude calculator 276, and each of the outputs of the first, second, and third magnitude calculators 280, 281 to 282, is coupled to a fifth adder 283.

During operation, a predetermined number of samples, or block, of the digitized current waveforms 152 ($I'_{A1}$) through 154 ($I'_{An}$) are buffered via corresponding FIFO buffers 252, 253 to 254 to form a block of digitized current samples. In one embodiment, the depth of the FIFO buffers 252, 253 to 254 may be selected to be equal to the number of samples digitized by the A/D converter 120 in one cycle of the power system current waveforms. For example, each of the FIFO buffers 252, 253 to 254 may be configured to store 24 digitized samples. It is contemplated that the buffer depth may be equivalent to one of any number of digitized samples as long as the value is an integral multiple of the number of samples digitized by the A/D converter 120 in one cycle of the power system current waveform.

The output of each of the FIFO buffers 252, 253 to 254 (i.e., the corresponding block of digitized current samples is subtracted from the digitized current sample streams 152 ($I'_{A1}$) through 154 ($I'_{An}$) to form corresponding digitized difference current sample streams 272, 273 to 274. As illustrated, the delta operate current 190, $\Delta I_{A\_operate}$, is formed by adding together each of the digitized difference current sample stream 272, 273 to 274 via the fourth adder 275, and then taking the magnitude of the result via the magnitude calculator 276. Thus, $\Delta I_{A\_operate}$ is equal to the magnitude of the sum of the digitized difference current sample stream 272, 273 to 274. The delta restraint current 191, $\Delta I_{A\_restraint}$, is formed by taking the magnitude of each of the digitized difference current sample stream 272, 273 to 274 via respective magnitude calculators 280, 281 to 282, and then adding the outputs from the respective magnitude calculators 280, 281 to 282 via the fifth adder 283. Thus, $\Delta I_{A\_restraint}$ is equal to the sum of the magnitudes of the digitized difference current sample stream 272, 273 to 274.

Referring again to FIG. 5, the qualification time $T_{pu}$ associated with the qualification timer 214 may be selected to be one of many values, depending on the depth of FIFO buffers 252, 253 to 254. When an open CT condition occurs, the delta operate current 190, $\Delta I_{A\_operate}$, and the delta restraint current 191, $\Delta I_{A\_restraint}$ will likely be a substantially non-zero value for a length of time corresponding to the depth of the FIFO buffers 252, 253 to 254. For example, if each of the FIFO buffers 252, 253 to 254 stores a respective block of digitized current samples corresponding to one cycle of the power system current waveform, then the delta operate current 190, $\Delta I_{A\_operate}$, and the delta restraint current 191, $\Delta I_{A\_restraint}$ will have substantially non-zero values for one cycle of the power system current waveform when an open CT condition occurs. Proper selection of the qualification time $T_{pu}$ prevents the S/R flip-flop 186 from being set in response to a transient measurement error within the current differential relay 100 or in response to a transient noise spike on one or more inputs to the current differential relay 100. If the qualification time $T_{pu}$ is longer than the "fill" time associated with the depth of each of the FIFO buffers 252, 253 to 254, then the S/R flip-flop 186 will not set in response to an open CT condition, and the current differential relay 100 may function improperly. A suitable selection for the qualification time $T_{pu}$ may therefore be ¼ of a cycle of the power system current waveform.

Figure 7:
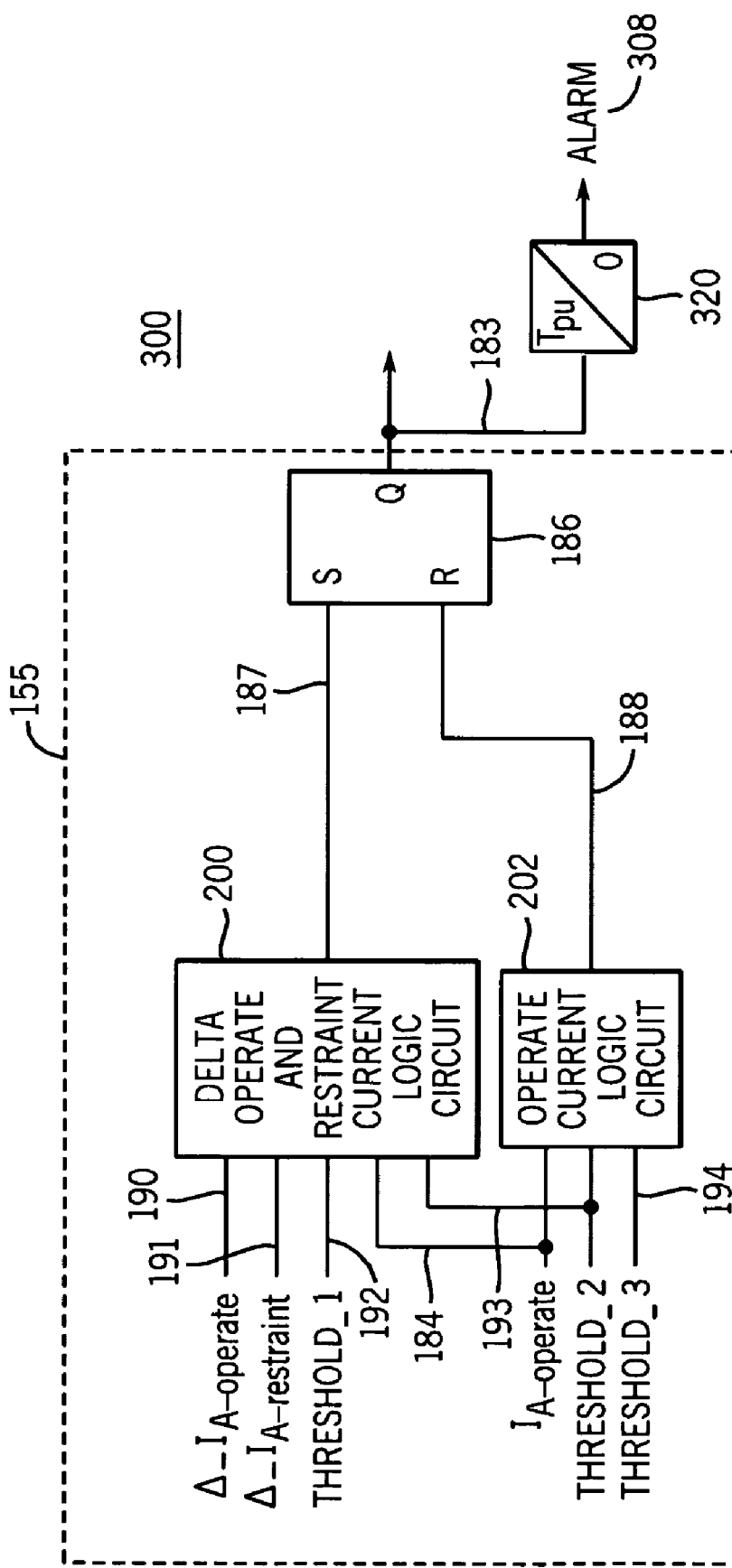
FIG. 7 is an exemplary detailed logic block diagram of Lost CT detected logic circuit assembly according to an embodiment of the invention.

FIG. 7 is an exemplary detailed logic block diagram of Lost CT detected logic circuit assembly 300 according to an embodiment of the invention. Rather than providing the binary signal 183 to the AND-gate 182 for purposes of blocking a trip signal when an open CT condition is detected, the flip-flop 186 of FIG. 7 provides the binary signal 183 to, for example, an alarm via a qualification timer 320. As previously mentioned, the Lost CT detected logic circuit assembly 300 is preferably included in the current differential relay 100.

Referring to FIG. 7, the Lost CT detected logic circuit assembly 300 includes the lost CT detected logic circuit 155 operatively coupled to the qualification timer 320. The lost CT detected logic circuit 155 includes the delta operate and restraint current logic circuit 200 configured to provide the binary signal 187 in response to at least one first comparison of at least one calculated current value (e.g., the delta operate current 190, $\Delta I_{A\_operate}$) of the like-phase digitized current sample streams 152 $I'_{A1}$, 153 $I'_{A2}$ to 154 $I'_{An}$, to at least one first threshold value of a plurality of threshold values. As illustrated above in FIG. 5, the delta operate and restraint current logic circuit 200 utilizes the first and second threshold values 192 and 193. The plurality of like-phase digitized current sample streams are derived from a corresponding plurality of secondary current waveforms provided by each of the n current transformers 54, 56, 58 to 60. The Lost CT detected logic circuit assembly 300 also includes the operate current logic circuit 202 configured to provide the binary signal 188 in response to at least one second comparison of at least one calculated current value (e.g., the operate current value 184 illustrated as $I_{A\_operate}$) of the like-phase digitized current sample streams 152 $I'_{A1}$, 153 $I'_{A2}$ to 154 $I'_{An}$, to at least one second threshold value of the plurality of threshold values. As illustrated above in FIG. 5, operate current logic circuit 202 utilizes the second and third threshold values 193 and 194.

Also included is the S/R flip-flop 186 having a set input S adapted to receive the binary signal 187 and a reset input R adapted to receive the binary signal 188. The S/R flip-flop 186 is configured to provide the binary signal 183 in response to selective assertion of one of the set input and the reset input. The binary signal 183 indicates loss of a current transformer connection when the set input is asserted and indicates no loss of a current transformer connection when the reset input is asserted. In an embodiment, the set input is asserted when the binary signal 187 has a first value (e.g., a logic high), and the reset input is asserted when the binary signal 188 has the first value. As described above, after the set input S is asserted, the output Q remains asserted until the reset input R asserts.

The Lost CT detected logic circuit assembly 300 also includes an alarm 308 operatively coupled (via the qualification timer 320) to the set reset flip-flop 186. The alarm 308 is responsive to the binary signal 183 to indicate an occurrence of the binary signal 187 having the first value. The alarm indication may be, for example, an audible indication, a visual indication, a page sent or an email sent, etc. The qualification timer 320 is included to cause a predetermined time delay between the occurrence of the binary signal 187 having the first value and an associated alarm indication. If the reset input R is asserted during the predetermined time delay however, the output Q de-asserts and no alarm is generated.

Figure 8:
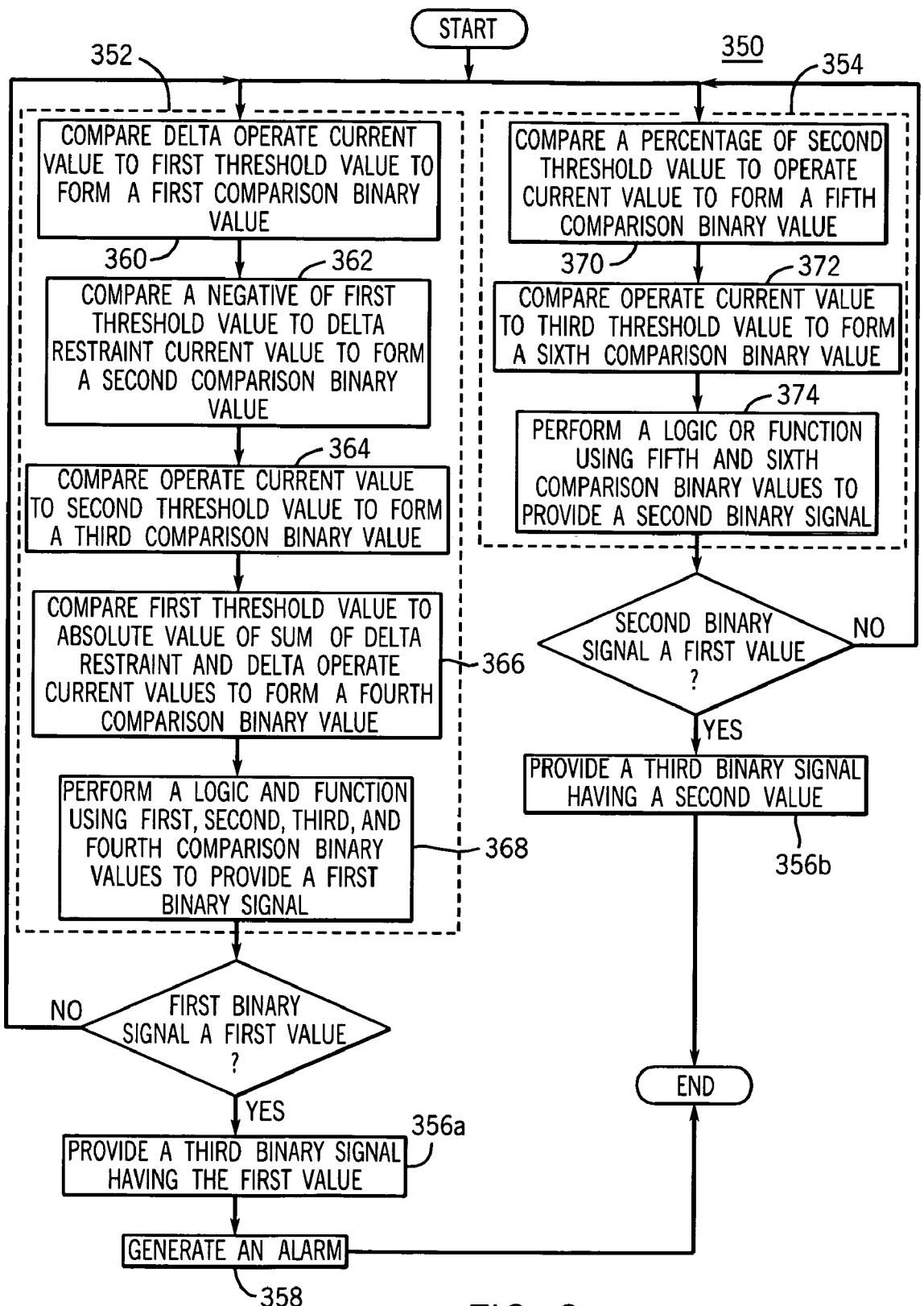
FIG. 8 is a flowchart of a method for detecting a loss of a current transformer connection using the logic circuit assembly of FIG. 7 according to an embodiment of the invention.

FIG. 8 is a flowchart of a method 350 for detecting a loss of a current transformer connection using the Lost CT detected logic circuit assembly 300 according to an embodiment of the invention. The connection is provided by the current transformers 54, 56, 58 to 60 coupling the current differential relay 100 to the protected element 40 of a three-phase power system. As mentioned above, the current transformers 54, 56, 58 to 60 provide a corresponding plurality of secondary current waveforms to the current differential relay 100. Although preferably executed by the microcontroller 130 of the current differential relay 100, it is contemplated that the method 350 may be executed by a FPGA or by another microcontroller coupled to the current differential relay 100.

The method 350 for detecting a loss of a current transformer connection begins when the binary signal 187 is provided in response to at least one first comparison of at least one calculated current value of the like-phase digitized current sample streams 152 $I'_{A1}$, 153 $I'_{A2}$ to 154 $I'_{An}$ to at least one first threshold value of a plurality of threshold values (step 352). Next, the binary signal 188 is provided in response to at least one second comparison of at least one calculated current value of the like-phase digitized current sample streams 152 $I'_{A1}$, 153 $I'_{A2}$ to 154 $I'_{An}$ to at least one second threshold of the plurality of threshold values (step 354), and the binary signal 183 is selectively provided in response to the binary signal 187 and the binary signal 188 (step 356). The binary signal 183 indicates loss of a current transformer connection when the binary signal 187 has a first value (e.g., a logic high) and indicates no loss of a current transformer connection when the binary signal 188 has the second value.

In an embodiment, an alarm indication is generated when the binary signal 183 has the first value (step 358). In another embodiment, a time delayed alarm indication is generated when the binary signal 183 has the first value.

The binary signal 187 is provided as a result of comparing the delta operate current value 190 to the first threshold value 192 to yield a first comparison binary value (step 360), comparing a negative of the first threshold value 192 and the delta restraint current value 191 to yield a second comparison binary value (step 362), comparing the operate current value 184 and the second threshold value 193 to yield a third comparison binary value (step 364), comparing the first threshold value 192 to a magnitude of a sum of the delta restraint current value 191 and the delta operate current value 190 to yield a fourth comparison binary value (step 366), and performing a logic AND function using the first, second, third and fourth comparison binary values to provide the binary signal 187 (step 368). The binary signal 187 may be provided after a predetermined qualification time.

The binary signal 187 has the first logic value when the delta operate current value 190 is greater than the first threshold value 192, the delta restraint current value 191 is less than the negative value of the first threshold value 192, the magnitude of the sum of the delta restraint current value 191 and the delta operate current value 190 is less than the first threshold value 192, and the operate current value 184 is greater than the second threshold value 193.

The binary signal 188 is provided as a result of comparing a preselected percentage (e.g., ninety percent) of the second threshold value 193 to the operate current value 184 to yield a fifth comparison binary value (step 370), comparing the operate current value 184 to the third threshold value 194 to yield a sixth comparison binary value (step 372), and performing a logic OR function using the fifth and sixth comparison binary values to provide the binary signal 188 (step 374). The binary signal 188 has the first value when the operate current value 184 is less than the pre-selected percentage of the second threshold value 193, or when the operate current value 184 is greater than the third threshold value 194.

Preferably, each of the first and second threshold values 192, 193 is less than a trip value required to cause the current differential relay 100 to generate the trip signal. The first threshold value 192 is greater than a maximum noise level value of the secondary current waveforms, and each of the second and third threshold values 193, 194 is greater than a standing operate current value of the current differential relay 100. The third threshold value 194 is less than the expected operate current generated for a fault in the protected element 40. The operate current value 184 is equivalent to a magnitude of a sum of the plurality of like-phase digitized current sample streams 152 $I'_{A1}$, 153 $I'_{A2}$ to 154 $I'_{An}$, and the delta operate current value 190 is equivalent to a magnitude of a sum of a plurality of digitized difference current sample streams 272, 273 to 274 formed by subtracting a predetermined number (i.e., a block) of samples of the plurality of digitized current sample streams 152 $I'_{A1}$, 153 $I'_{A2}$ to 154 $I'_{An}$, from the plurality of digitized current sample streams 152 $I'_{A1}$, 153 $I'_{A2}$ to 154 $I'_{An}$. The delta restraint current value 191 is equivalent to a sum of a plurality of magnitudes of the plurality of digitized difference current sample streams 272, 273 to 274.

While the embodiments described herein use all of the available power system current waveforms to determine the operation of the current differential element 100, it will be appreciated by one skilled in the art of protective relaying that the various embodiments of the invention may use a subset of the power system current waveforms for the purposes of providing secure current differential protection to a specific zone of protection, or for providing secure current differential protection to only a portion of the protected element 40. That is, an embodiment may include power system current waveforms $I_{Ak}$ through $I_{Am}$, $I_{Bk}$ through $I_{Bm}$, and $I_{Ck}$ through $I_{Cm}$ where $k \geq 1$ and $m \leq n$, and where those power system current waveforms define a zone of protection that may, or may not, encompass the entire protected element 40.

As may be apparent from the above discussion, implementation of the apparatus and method for detecting the loss of a current transformer connection disclosed herein prevents a current differential relay from mis-operating when a connection between a CT and the current differential relay is open or short circuited. The embodiments of the apparatus and method disclosed herein are applicable to current differential relays configured to protected a wide range of power system elements such as electrical generators, electrical motors, power transformers, power transmission lines, buses and capacitors, to name a few. Further, the embodiments of the apparatus and method for detecting a loss of a CT connection may be utilized in a variety of suitable applications such as generating an alarm to notify personnel of an open CT connection, or preventing a trip signal from being erroneously generated when no actual fault exists in the protected element.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A protective relay configured to prevent generation of a trip signal by a power system element of a three-phase power system when a current transformer connection is lost, the current transformer connection provided by one of a plurality of current transformers coupling the protective relay to the power system element and providing a corresponding plurality of secondary current waveforms of the three-phase power system to the protective relay, the protective relay comprising:

a signal logic circuit configured to provide a first binary signal in response to receipt of a plurality of like-phase digitized current sample streams derived from the plurality of secondary current waveforms, a first value of the first binary signal indicating an occurrence of a short circuit in the power system element;

a lost current transformer (CT) detection logic circuit configured to provide a second binary signal in response to at least one comparison of at least one calculated current value of the plurality of like-phase digitized current sample streams to at least one threshold value, a first value of the second binary signal indicating the current transformer connection loss and a second value of the second binary signal indicating lack of impairment of the current transformer connection; and a trip logic circuit coupled to the signal logic circuit and the lost CT detection logic circuit, the trip logic circuit configured to generate the trip signal when the first binary signal has the first value and the second binary signal has a the second value, and to prevent generation of the trip signal when the second binary signal has the first value.

2. The protective relay of claim 1, wherein the first binary signal is provided in response to a comparison of a magnitude of a sum of the plurality of like-phase digitized current sample streams to a pickup current threshold value plus a sum of a first preselected percentage of a plurality of magnitudes of the plurality of like-phase digitized current sample streams.

3. The protective relay of claim 1, wherein the protective relay comprises a current differential relay.

4. The protective relay of claim 1, wherein the lost CT detection circuit comprises:

a delta operate and restraint current logic circuit configured to provide a third binary signal;

an operate current logic circuit configured to provide a fourth binary signal; and a set reset flip-flop having a set input adapted to receive the third binary signal and a reset input adapted to receive the fourth binary signal, the set reset flip-flop configured to provide the second binary signal in response to selective assertion of the set and reset inputs.

5. The protective relay of claim 4, wherein the delta operate and restraint current logic circuit comprises:
- a first comparator having a first input adapted to receive a delta operate current value and a second input adapted to receive a first threshold value of the plurality of threshold values;
- a second comparator having a first input adapted to receive a negative value of the first threshold value and a second input adapted to receive a delta restraint current value;
- a third comparator having a first input adapted to receive an operate current value and a second input adapted to receive a second threshold value of the plurality of threshold values;
- a fourth comparator having a first input adapted to receive the first threshold value and a second input adapted to receive a magnitude of a sum of the delta restraint current value and the delta operate current value;
- a first AND-gate coupled to each of the first, second, third and fourth comparators, the first AND-gate configured to provide a fifth binary signal in response to operation of each of the first, second, third and fourth comparators; and
- a qualification timer coupled to the first AND-gate and configured to provide the third binary signal to the set input of the set reset flip-flop in response to operation of the first AND-gate.

6. The protective relay of claim 5, wherein the set input is asserted via the third binary signal when the delta operate current value is greater than the first threshold value, the delta restraint current value is less than the negative value of the first threshold value, the magnitude of the sum of the delta restraint current value and the delta operate current value is less than the first threshold value, the operate current value is greater than the second threshold value, and the fifth binary signal causes the qualification timer to be asserted for a pre-determined qualification time.

7. The protective relay of claim 5, wherein the operate current logic circuit comprises:
- a fifth comparator having a first input adapted to receive a second preselected percentage of the second threshold value and a second input adapted to receive the operate current value;
- a sixth comparator having a first input adapted to receive the operate current value and a second input adapted to receive a third threshold value of the plurality of threshold values; and
- an OR-gate coupled to each of the fifth and sixth comparators and configured to provide the fourth binary signal in response to operation of the fifth and sixth comparators.

8. The protective relay of claim 7, wherein the second preselected percentage is about ninety percent.

9. The protective relay of claim 7, wherein the fourth binary signal causes the reset input to be asserted when the operate current value is less than the second preselected percentage of the second threshold value.

10. The protective relay of claim 7, wherein the fourth binary signal causes the reset input to be asserted when operate current value is greater than the third threshold value.

11. The protective relay of claim 7, wherein each of the first and second threshold values is less than a trip value required to cause the protective relay to generate the trip signal, wherein the first threshold value is greater than a maximum noise level value of the plurality of secondary current waveforms, wherein each of the second and third threshold values is greater than a standing operate current value of the protective relay, and wherein the third threshold value is less than an expected operate current generated for a fault in the power system element.

12. The protective relay of claim 7, wherein the operate current value is equivalent to a magnitude of a sum of the plurality of like-phase digitized current sample streams, wherein the delta operate current value is equivalent to a magnitude of a sum of a plurality of digitized difference current sample streams formed by subtracting respective blocks of the digitized current samples from corresponding digitized current sample streams, and wherein the delta restraint current value is equivalent to a sum of a plurality of magnitudes of the plurality of digitized difference current sample streams.

13. The protective relay of claim of claim 1, wherein the trip logic circuit comprises an AND-gate having a first input adapted to receive the first binary signal and a second input adapted to receive an inverse of the second binary signal.

14. An apparatus for detecting a loss of a current transformer connection provided by one of a corresponding plurality of current transformers coupling a protective relay to a power system element of a three-phase power system and providing a plurality of secondary current waveforms of the three-phase power system to the protective relay, the apparatus comprising:
- a first logic circuit configured to provide a first binary signal in response to at least one first comparison of at least one calculated current value of a plurality of like-phase digitized current sample streams to at least one first threshold value of a plurality of threshold values, the plurality of like-phase digitized current sample streams derived from the plurality of secondary current waveforms;
- a second logic circuit configured to provide a second binary signal in response to at least one second comparison of at least one calculated current value of the plurality of like-phase digitized current sample streams to at least one second threshold value of the plurality of threshold values; and
- a set reset flip-flop having a set input adapted to receive the first binary signal and a reset input adapted to receive the second binary signal, the set reset flip-flop configured to provide a third binary signal in response to selective assertion of one of the set input and the reset input, the third binary signal indicating loss of a current transformer connection when the set input is asserted and indicating no loss of a current transformer connection when the reset input is asserted.

15. The apparatus of claim 14, wherein the set input is asserted when the first binary signal has a first value, and wherein the reset input is asserted when the second binary signal has the first value.

16. The apparatus of claim 15, further comprising an alarm operatively coupled to the set reset flip-flop, the alarm responsive to the third binary signal to indicate an occurrence of the first binary signal having the first value.

17. The apparatus of claim 16, further comprising a first qualification timer coupled to the set reset flip-flop and the alarm, the first qualification timer configured to cause a predetermined time delay between the occurrence of the first binary signal having the first value and an associated alarm indication.

18. The apparatus of claim 14, wherein the first logic circuit comprises:
  a first comparator having a first input adapted to receive a delta operate current value and a second input adapted to receive a first threshold value of the plurality of threshold values;
  a second comparator having a first input adapted to receive a negative of the first threshold value and a second input adapted to receive a delta restraint current value;
  a third comparator having a first input adapted to receive an operate current value and a second input adapted to receive a second threshold value of the plurality of threshold values;
  a fourth comparator having a first input adapted to receive the first threshold value and a second input adapted to receive a magnitude of a sum of the delta restraint current value and the delta operate current value;
  a first AND-gate coupled to each of the first, second, third and fourth comparators, the first AND-gate configured to provide a third binary signal in response to operation of each of the first, second, third and fourth comparators; and
  a second qualification timer coupled to the first AND-gate and configured provide the first binary signal to the set input of the set reset flip-flop in response to operation of the first AND-gate.

19. The apparatus of claim 18, wherein the set input is asserted when the delta operate current value is greater than the first threshold value, the delta restraint current value is less than the negative value of the first threshold value, the magnitude of the sum of the delta restraint current value and the delta operate current value is less than the first threshold value, the operate current value is greater than the second threshold value, and the third binary signal causes the second qualification timer to be asserted for a pre-determined qualification time.

20. The apparatus of claim 18, wherein the second logic circuit comprises:
  a fifth comparator having a first input adapted to receive a preselected percentage of the second threshold value and a second input adapted to receive the operate current value;
  a sixth comparator having a first input adapted to receive the operate current value and a second input adapted to receive a third threshold value of the plurality of threshold values; and
  an OR-gate coupled to each of the fifth and sixth comparators and configured to provide the second binary signal in response to operation of the fifth and sixth comparators.

21. The apparatus of claim 20, wherein the preselected percentage is about ninety percent.

22. The apparatus of claim 20, wherein the reset input is asserted when the operate current value is less than the preselected percentage of the second threshold value.

23. The apparatus of claim 20, wherein the reset input is asserted when the operate current value is greater than the third threshold value.

24. The apparatus of claim 20, wherein each of the first and second threshold values is less than a trip value required to cause the protective relay to generate the trip signal, wherein the first threshold value is greater than a maximum noise level value of the plurality of secondary current waveforms, wherein each of the second and third threshold values is greater than a standing operate current value of the protective relay, and wherein the third threshold value is less than an expected operate current generated for a fault in the power system element.

25. The apparatus of claim 20, wherein the operate current value is equivalent to a magnitude of a sum of the plurality of like-phase digitized current sample streams, wherein the delta operate current value is equivalent to a magnitude of a sum of a plurality of digitized difference current sample streams formed by subtracting respective blocks of the digitized current samples from corresponding digitized current sample streams, and wherein the delta restraint current value is equivalent to a sum of a plurality of magnitudes of the plurality of digitized difference current sample streams.

26. The apparatus of claim 14, wherein the protective relay comprises a current differential relay.

27. In a protective relay including a microcontroller, a method for detecting a loss of a current transformer connection provided by a plurality of current transformers coupling the protective relay to a power system element of a three-phase power system and providing a plurality of secondary current waveforms of the three-phase power system to the protective relay, the method comprising:
  providing a first binary signal in response to at least one first comparison of at least one calculated current value of a plurality of like-phase digitized current sample streams to at least one first threshold value of a plurality of threshold values, the plurality of like-phase digitized current sample streams derived from the plurality of secondary current waveforms;
  providing a second binary signal in response to at least one second comparison of at least one calculated current value of the plurality of like-phase digitized current sample streams to at least one second threshold of the plurality of threshold values; and
  providing a third binary signal in response to the first and second binary signals, the third binary signal indicating loss of a current transformer connection when the first binary signal has a first value and indicating no loss of a current transformer connection when the second binary signal has the first value.

28. The method of claim 27, generating an indication when the third binary signal has the first value, the third binary having the first value when the first binary signal has the first value.

29. The method of claim 27, generating a time delayed indication when the third binary signal has the first value, the third binary having the first value when the first binary signal has the first value.

30. The method of claim 27, further comprising:
  comparing a delta operate current value to a first threshold value of the plurality of threshold values to yield a first comparison binary value;
  comparing a negative of the first threshold value and a delta restraint current value to yield a second comparison binary value;
  comparing an operate current value and a second threshold value of the plurality of threshold values to yield a third comparison binary value;
  comparing the first threshold value to a magnitude of a sum of the delta restraint current value and the delta operate current value to yield a fourth comparison binary value; and
  performing a logic AND function using the first, second, third and fourth comparison binary values to provide the first binary signal.

31. The method of claim 30, further comprising providing the first binary signal after a predetermined qualification time.

32. The method of claim 30, wherein the first binary signal has the first logic value when the delta operate current value is greater than the first threshold value, the delta restraint current value is less than the negative value of the first threshold value, the magnitude of the sum of the delta restraint current value and the delta operate current value is less than the first threshold value, and the operate current value is greater than the second threshold value.

33. The method of claim 30, further comprising:
   comparing a preselected percentage of the second threshold value to the operate current value to yield a fifth comparison binary value;
   comparing the operate current value to a third threshold value of the plurality of threshold values to yield a sixth comparison binary value; and
   performing a logic OR function using the fifth and sixth comparison binary values to provide the second binary signal.

34. The method of claim 33, wherein the preselected percentage is about ninety percent.

35. The method of claim 33, wherein the second binary signal has the first value when the operate current value is less than the pre-selected percentage of the second threshold value.

36. The method of claim 33, wherein the second binary signal has the first value when the operate current value is greater than the third threshold value.

37. The method of claim 33, wherein each of the first and second threshold values is less than a trip value required to cause the protective relay to generate the trip signal, wherein the first threshold value is greater than a maximum noise level value of the plurality of secondary current waveforms, wherein each of the second and third threshold values is greater than a standing operate current value of the protective relay, and wherein the third threshold value is less than an expected operate current generated for a fault in the power system element.

38. The method of claim 33, wherein the operate current value is equivalent to a magnitude of a sum of the plurality of like-phase digitized current sample streams, wherein the delta operate current value is equivalent to a magnitude of a sum of a plurality of digitized difference current sample streams formed by subtracting respective blocks of the digitized current samples from corresponding digitized current sample streams, and wherein the delta restraint current value is equivalent to a sum of a plurality of magnitudes of the plurality of digitized difference current sample streams.

39. The method of claim 27, wherein the protective relay comprises a current differential relay.

* * * * *